United States Patent [19]

Manin

[11] Patent Number: 4,508,191

[45] Date of Patent: Apr. 2, 1985

[54] METHOD AND DEVICE FOR INITIATING AN UNDERWATER IMPLOSIVE SEISMIC SOURCE

[75] Inventor: Michel Manin, Sainte-Mesme, France

[73] Assignee: Compagnie Generale de Geophysique, Massy, France

[21] Appl. No.: 526,829

[22] Filed: Aug. 26, 1983

[30] Foreign Application Priority Data

Aug. 30, 1982 [FR] France .................. 82 14771

[51] Int. Cl.³ .................. G01V 1/00; G01V 1/04; G01V 1/38
[52] U.S. Cl. .................. 181/107; 181/110; 181/120
[58] Field of Search .......... 181/107, 110, 113, 115, 181/118, 120; 367/23, 24, 144, 146, 153, 154, 140, 912, 172, 149; 340/825.77

[56] References Cited

U.S. PATENT DOCUMENTS

| | | | |
|---|---|---|---|
| 3,544,983 | 12/1970 | Wallace, Jr. et al. | 340/825.77 |
| 3,687,218 | 9/1972 | Ritter | 181/107 |
| 3,712,408 | 1/1973 | Muniz | 181/120 |
| 3,985,199 | 10/1976 | Baird | 181/107 |
| 4,210,897 | 7/1980 | Hutchins | 181/110 |

FOREIGN PATENT DOCUMENTS

2102447 4/1972 France .
2245000 4/1975 France .

Primary Examiner—Maynard R. Wilbur
Assistant Examiner—Gregory C. Issing
Attorney, Agent, or Firm—Schwartz, Jeffery, Schwaab, Mack, Blumenthal & Koch

[57] ABSTRACT

The present invention relates to a method for initiating an underwater implosive seismic source which comprises the steps of: measuring the instantaneous pressure at the location of the source; determining, from this measured pressure, the bubble period separating the firing signal from the implosion peak of the shock wave; and initiating the source with a delay or advance of a value equal to the difference between the bubble period corresponding to the instantaneous pressure and that corresponding to the mean pressure. The invention also provides a device for carrying out this method which device comprises; means for measuring the instantaneous pressure in the neighborhood of the source; comparator means (C5) for comparing this pressure with a mean value; and time delay means (C3, C4) for delaying a firing signal (S1) by a value which is a function of the result of this comparison.

6 Claims, 6 Drawing Figures

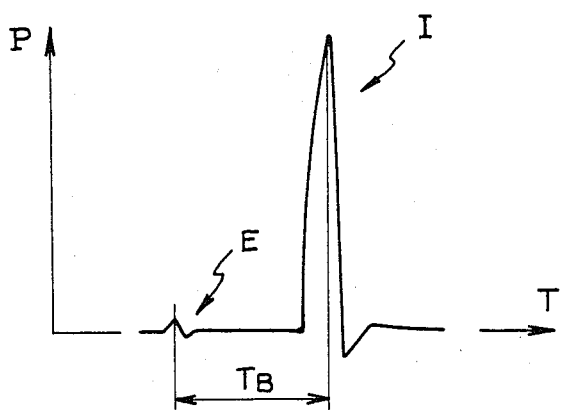
FIG_1
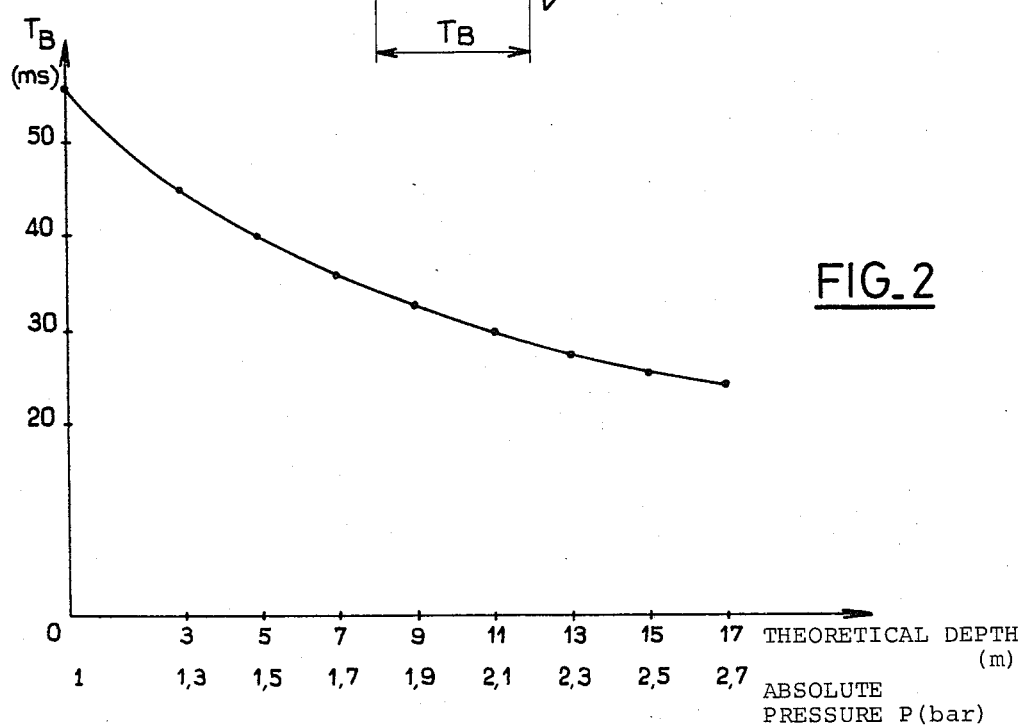
FIG_2
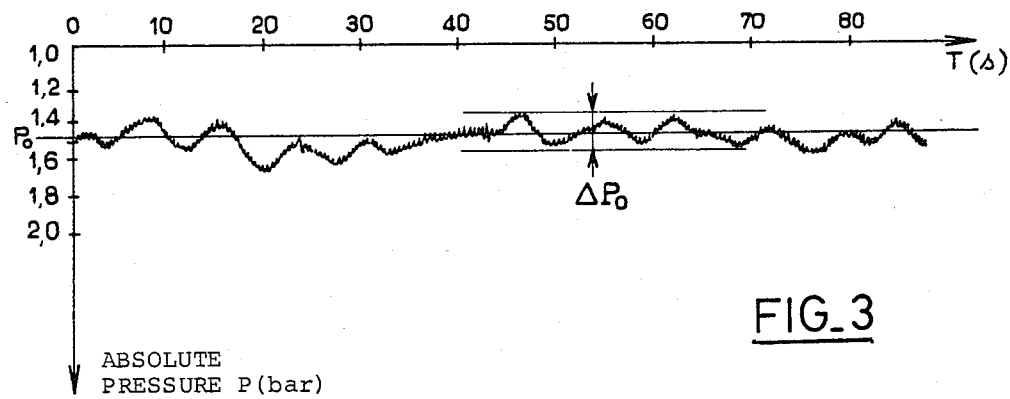
FIG_3

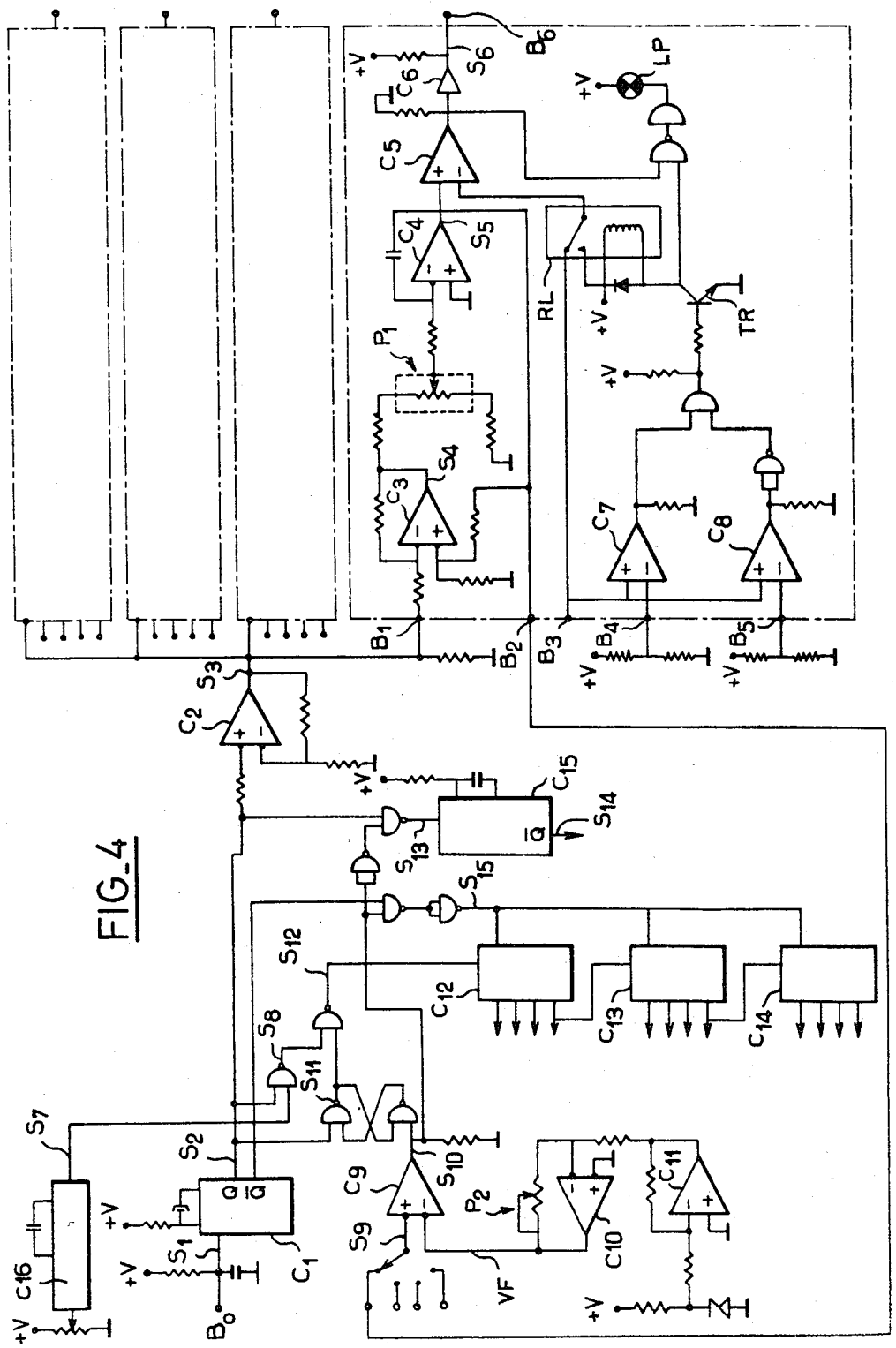
FIG_4

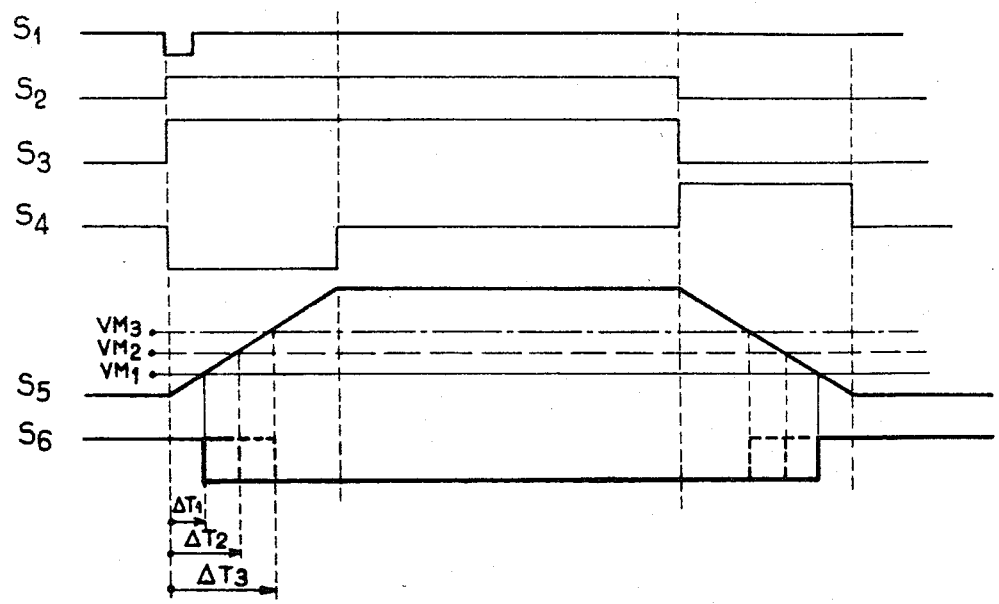
FIG_5
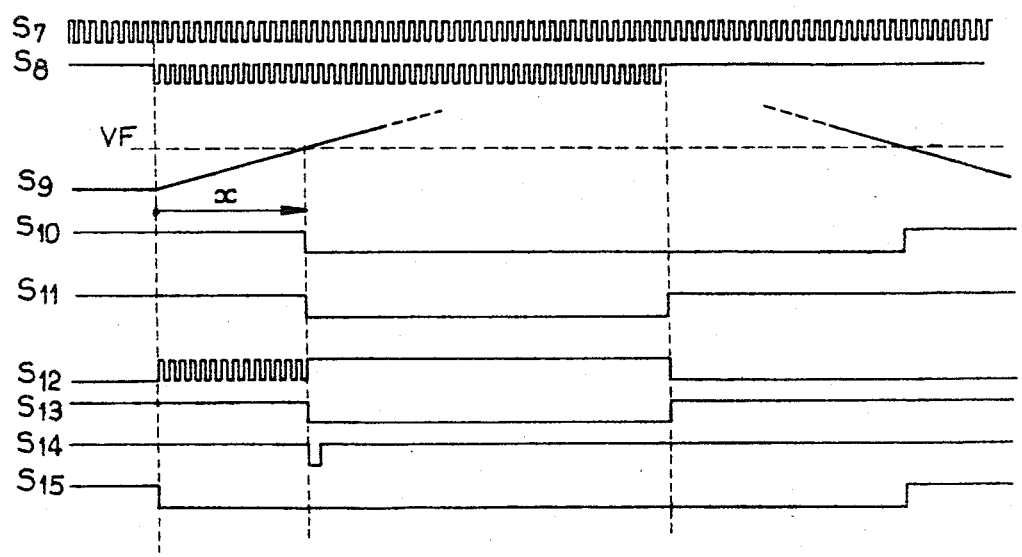
FIG_6

METHOD AND DEVICE FOR INITIATING AN UNDERWATER IMPLOSIVE SEISMIC SOURCE

BACKGROUND OF THE INVENTION

1. Field of the Invention

The present invention relates to a method of initiating an implosive underwater seismic source, and also to a device for carrying out said method.

2. Description of the Prior Art

Geophysical surveys are customarily carried out using inter alia implosive sources. This term embraces any source creating a shock wave by implosion of a volume containing a vacuum, or a volume of condensable vapour, under the effect of the pressure of the liquid medium in which the source is placed.

The implosion volume may notably be formed, in known manner, by injection into the body of water of superheated steam, or superheated water under pressure, or by vaporization of seawater by means of an electric arc, or again by cavitation caused mechanically as is the case for example in methods known in the art by the names WATERGUN and FLEXICHOC.

The shock wave has the general shape indicated in FIG. 1; there are generally observed two peaks, a first peak E called the "explosion" corresponds to ejection of steam, vaporization of the mass of superheated water, vaporization of seawater by the electric arc, or the mechanical force exercised by a moving member in contact with the seawater; a second peak I, or implosion peak, follows shortly afterwards at the moment of implosion of the cavity. It is this implosion peak which corresponds to the maximum energy of the shock wave; its amplitude is generally much greater than that of the explosion peak, and it is for this reason that sources of this type are called "implosive sources".

The time interval $T_B$ separating the "firing" signal and the implosion peak is called the "bubble period"; in fact this is the period of expansion of the bubble between the moment of its generation and that of its implosion.

Theoretical calculation and experiments show that the bubble period $T_B$ varies substantially according to the law;

$$(T_B) = k/P^{5/6} \quad (1)$$

k being a constant independent of the pressure. This function is shown in FIG. 2, in which the bubble period is indicated (in ms) as a function of the absolute pressure P (in bars) which is also expressed as a function of the theoretical depth (in m) at which the source is immersed.

This dependency of the bubble period on the pressure can cause problems: in fact, in order to increase the amplitudes emitted, several charges are fired simultaneously and the signals are synchronised on the strongest peak, that is to say the implosion peak. For all the sources of the type described above, there is easily controlled the start of the time for the signal causing firing to operate (at present better than one millisecond) as this start is directly controlled, without a long delay, by pneumatic, mechanical or electrical means. On the other hand the occurrence of the implosion peak cannot be controlled precisely as it depends, as has just been seen, on the depth of immersion of the charges at the moment of firing, itself depending on the height and movement of surface waves and also on the movement of the towed charges (it is easy to synchronise the explosive sources for which the occurrence of the explosion peak is independent of the local pressure).

It has been found that a variation of 0.1 bar (variation in depth of 1 m) in the local pressure causes variations of 2 to 3 ms in the bubble period. This variation is significant, notably for long bubble periods, and makes the synchronization of different implosions imperfect. There results a reduction in amplitude and loss of high frequencies.

In fact, the purity of the signal emitted affects the possible precision of analysis of the seismic signals received, the signal will be more pure as the shock wave approaches a simple Dirac impulse, that is with an implosion peak as narrow as possible. Any separation, even minimal, in the occurrence of implosions from different sources alters the signal emitted from its theoretical ideal.

Up to now there have only been proposed, to improve this synchronisation, devices analysing, over a series of firings, the periods separating the real instants of occurrence of the implosion peaks from the theoretical instant and allowing correction, in advance or in retard, of initiation of a future firing by a value equal to the running average of the periods separating the previous firings. These devices, which depend on statistical analysis of the preceding firings, allow taking account of the dispersion of the parameters from one series of firings to another, notably the unequal depths of the charges. They are on the other hand not able to compensate errors due to variations of these parameters with time, from one firing to another (in the same series of firings, and not from one series of firings to another). This is the case for the depths of immersion, which vary for the same charge with time, and from one charge to another at the same instant.

It has in fact been found that the fluctuations in the bubble period which result are always much greater than errors in the moment of initiating a firing (of the order of 0.3 to 0.7 ms, due to variations in the control system at source), which may be considered negligible in comparison with the foregoing.

SUMMARY OF THE INVENTION

To improve synchronisation of the sources, the invention suggests an initiation method comprising, for each source, the steps of: first measuring the instantaneous pressure P at the location of the source, determining, from this measured pressure, the bubble period which separates the explosion peak from the implosion peak, initiating the source with application of a compensating delay $\Delta T$, equal to the difference in bubble period corresponding to the instantaneous pressure P and that corresponding to the mean pressure Po at the location of the source if this difference is negative, or with application of a compensating advance of the same value in the reverse case.

In fact, fluctuations in hydrostatic pressure are very slow in comparison with the time separating the initial measurement of the pressure P (a measurement which slightly precedes the firing signal) from occurrence of the implosion peak. FIG. 3 shows an example of these variations of pressure with time: it can be seen that the period of variation is several seconds and, under these conditions, it is reasonable to consider that the total pressure is constant during development of the bubble and will be the same a few fractions of a second later.

This method may be used with advantage in combination with the statistical correction method of the prior art, which will thus minimize all the causes of errors associated with constant factors during a series of firings.

By application of relation (1), the compensating delay or advanced will be determined by:

$$\Delta T = k \cdot \left( \frac{1}{P_0^{5/6}} - \frac{1}{P^{5/6}} \right) \quad (2)$$

Calculation of small variations allows the preceding law (2) to be linearised for small values of pressure around a mean pressure Po:

$$\Delta T = \alpha \cdot (P - P_0) \quad (3)$$

α being a constant which is a function of the mean pressure Po and the corresponding mean period.

The invention also proposes a device for carrying out this method, comprising:
means for measuring the instantaneous pressure arranged in the neighbourhood of the source,
means for comparing this pressure with a mean value, delay means, for delaying a firing signal by a value which is a function of the result of this comparison.

It is the primary object of the present invention to provide a method and an apparatus for initiating an underwater seismic source at a time such that the implosion peak occurs at a fixed time despite variations in the depth of the charge.

Other characteristics and advantages will appear from a reading of the detailed description of an example of a device according to the invention, given with reference to the accompanying drawings.

BRIEF DESCRIPTION OF THE DRAWINGS

FIG. 1 is a graph showing variations of pressure with time following initiation of an implosive underwater seismic source.

FIG. 2 is a graph showing variations of the bubble period ($T_B$) with the depth of the charge.

FIG. 3 is a graph showing typical variations of pressure with time for a charge which is nominally at a fixed depth.

FIG. 4 shows a circuit diagram of the device.

FIGS. 5 and 6 show the forms of signal retrieved at different points S1 to S15 of the circuit of FIG. 4.

DETAILED DESCRIPTION OF THE PREFERRED EMBODIMENT

The assembly described by FIG. 4 allows synchronization of up to four independent charges, but this number may be increased without difficulty by increasing the number of channels in accordance with the number of charges.

On giving of a single firing signal applied to terminal B0 of the circuit the latter will provide, at terminals B6 of the four channels, four signals which are separated in time, of which the separations are a function of the depth provided by four manometers positioned at the locations of the charges.

These manometers may be for example piezo-resistive pressure transducers sensitive to variations of the order of 0.01 bar (10 cm of water) with a sensitivity of the order of 1 volt for a variation in height of 1 meter of water and a bandwidth up to several kilohertz. The electric signal is applied to the terminal B3 of each channel.

Preferably the transducer is protected from shock waves created by the charges by means of a mechanical filter which allows passage only of very low frequencies, for example those less than 5 Hertz. The only variations of pressure measured will thus be those resulting from the variable height of water above the charge.

The firing signal arriving in the form of an impulse at terminal B0 (signal SI) actuates a monostable C1 at which the output Q (signal S2) is sent to the non-inverted input of a gain control amplifier C2. The output of this amplifier (signal S3) is sent to each of the terminals B1 of the control channels for each source.

Each of the channels (which are identical) comprises a ramp generator formed of two circuits C3 and C4. The pulses created by circuit C3 (signal S4) are integrated by circuit C4 (signal S5). The gradient is adjustable by means of a potentiometer P1, independently on each channel, in order to be able to adapt to different types of source and different depths for which they may be used.

The output of the ramp generator is connected to the non-inverted input of the comparator C5 of which the other input is connected, as a general rule, to the terminal B3, that is to say the voltage provided by the manometer associated with the source which is to be controlled. When the voltage from the ramp generator exceeds the value provided by the manometer, the comparator produces an output; thus, for a fixed gradient, the operation of the comparator will be more retarded as the depth increases. This acts in the direction of the desired correction (an increase in depth corresponds to a reduction in the bubble period); it is thus necessary to increase the delay).

The output of the comparator C5 is connected to an amplifier C6 of which the ouput signal (S6) forms the signal for controlling the source. In FIG. 5, the increasing delays ΔT1 to ΔT3 correspond to increasing depths, that is to say to increasing voltages VM1 to VM3 from the manometer.

The safety circuits C7 and C8 actuate, through transistor TR, the relay RL and pilot light LP. This action is obtained when the voltage from the manometer (on terminal B3) goes beyond a predetermined range, corresponding to two extreme depths of normal operation. The extreme values of the voltage are defined by two fixed voltages applied to the terminals B4 and B5. If the relay RL is actuated, the inverted input of the comparator C5 is disconnected from the manometer and connected to a D.C. voltage, for example the feed voltage. In this case the circuit reacts as if the charge is at constant depth and retains the possibility of initiation even if the manometer is out of action.

In order to facilitate adjustments, the value of the gradient controlled by the potentiometer P1 may be observed by means of circuits C9 to C15. A switch receives the signal from the ramp generator available on the terminals B2 of the channels and applies it (signal S9) to the non-inverted input of a comparator C9. The inverted input of this comparator is connected to the output of an assembly C10, C11 creating a fixed voltage VF which may be calibrated by the potentiometer P2. The comparator C9 thus produces an output (signal S10) at the end of time x which is the time taken by the ramp generator to reach value VF. The gradient will thus be displayed directly in milliseconds per volt. This display may be carried out in known manner by counting the impulses (signal S7) produced by the clock C16. Circuits C12 to C14 are decade counters for the display; circuit C15 allows the display to be controlled (signal S14). The signals S8, S11, S12 and S13 are relative to the signals which may be observed at different points of the counting circuit.

Singal S15 is a signal for resetting the display to zero.

Of course the present description is given without limiting character and the invention includes all variations within its spirit.

Having thus disclosed our invention, what we desire to be secured by Letters Patent of the United States is set forth in the appended claims.

What is claimed is:

1. A method of initiating an implosive seismic source under the surface of a body of water by creating a shock wave having an implosion peak resulting from an implosion of a cavity of which the internal pressure is less than the hydrostatic pressure, comprising the steps of:
    (a) measuring the instantaneous pressure P at the source;
    (b) determining, from the measured pressure, a bubble period which will separate a firing signal from the implosion peak;
    (c) initiating said source with a compensating time period $\Delta T$ equal to a difference between the bubble period corresponding to the instantaneous pressure P and a bubble period corresponding to the mean pressure Po at the source, wherein the compensating period $\Delta T$ is determined by the relationship:

$$\Delta T = k \cdot \left( \frac{1}{P_o^{5/6}} - \frac{1}{P^{5/6}} \right)$$

k being a constant independent of the pressure.

2. An apparatus for timing a firing signal of an implosive seismic source for creating a shockwave having an implosive peak resulting from the implosion of a cavity, said seismic source being disposed at a variable distance beneath the surface of a body of water comprising:
    (a) means for generating a pressure signal indicative of an instantaneous pressure P in the vicinity of said seismic source;
    (b) means for generating a characteristic signal Po representative of the mean distance of said seismic source beneath the surface;
    (c) means for comparing said pressure signal P with said signal Po representative of the mean distance of said seismic source beneath said surface and for generating a compensating time period $\Delta T$ determined by the relationship:

$$\Delta T = k \cdot \left( \frac{1}{P_o^{5/6}} - \frac{1}{P^{5/6}} \right)$$

k being a constant wherein the timing of said firing signal varies as a function of said compensation time period to compensate for changes in said pressure signal.

3. The apparatus of claim 2 wherein the timing of said firing signal is proportional to the timing of said comparison signal by a proportionality factor.

4. An apparatus for timing a firing signal of an implosive seismic source disposed at a variable distance beneath the surface of a body of water comprising:
    (a) means for generating a pressure signal P indicative of an instantaneous pressure in the vicinity of said seismic source;
    (b) means for generating a signal Po indicative of a mean distance of said seismic source beneath the surface;
    (c) means for comparing said pressure signal P with said signal Po indicative of the mean distance of said seismic source beneath the surface and for generating a compensating time period $\Delta T$ determined by the relationship:

$$\Delta T = k \cdot \left( \frac{1}{P_o^{5/6}} - \frac{1}{P^{5/6}} \right)$$

k being a constant wherein the timing of said firing signal varies as a function of said compensating time period; and,
    (d) a safety circuit operable to be actuated when said pressure signal exceeds a predetermined range of values.

5. The apparatus of claim 4 wherein said safety circuit further comprises a relay for disconnecting said pressure signal from said comparing means wherein said pressure signal exceeds said predetermined range of values.

6. The apparatus of claim 5 wherein said safety circuit further comprises a warning light energized whenever said presure signal exceeds said predetermined range of values.

* * * * *